Oct. 19, 1954 T. A. HARRIS 2,691,961
CONTROL MEANS FOR LIQUID-OPERATED SERVO MECHANISMS
Filed April 24, 1952
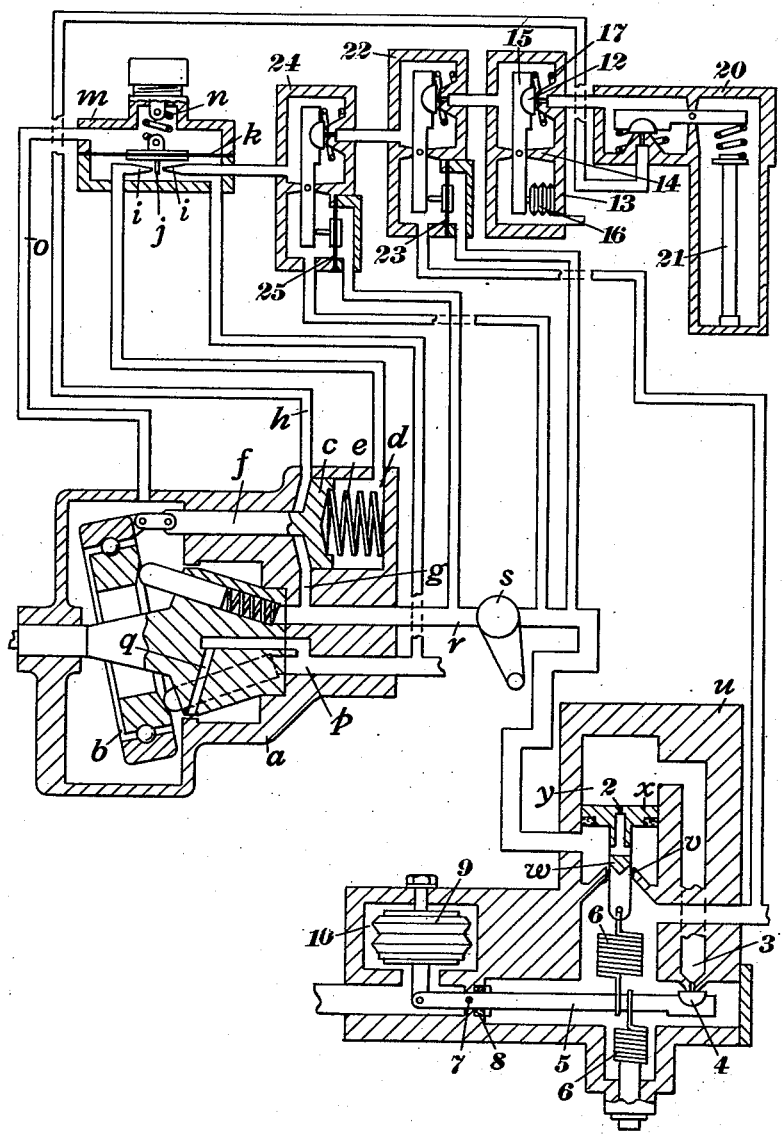
Inventor
T. A. Harris Patented Oct. 19, 1954

2,691,961

UNITED STATES PATENT OFFICE 2,691,961

CONTROL MEANS FOR LIQUID-OPERATED SERVO MECHANISMS

Thomas Alfred Harris, Edgbaston, Birmingham, England, assignor to Joseph Lucas (Industries) Limited, Birmingham, England Application April 24, 1952, Serial No. 284,187

Claims priority, application Great Britain April 25, 1951

2 Claims. (Cl. 121—38)

A known kind of liquid-operated servo-mechanism for controlling the rate of supply of liquid fuel to the combustion chamber of a jet engine, gas turbine or other prime mover, comprises a cylinder in which is contained a piston, the latter being adapted to actuate the control means of a variable delivery fuel pump, or a throttle valve, by-pass valve or other regulating means in the fuel supply system.

For actuating the servo-mechanism, motive liquid under pressure is supplied to both ends of the cylinder, the supply to one end being conveyed through a duct consisting of two coaxial parts having a gap between their adjacent ends. The motive liquid may be supplied by the fuel pump of the system, or from any other source. Further the liquid supplied to the two ends of the servo cylinder need not be derived from the same source. In some cases the piston is loaded by a spring. For varying the flow across the gap in the said duct, there is provided a baffle means which is movable transversely across the gap in response to the action of a controlling means. In one example the baffle means is attached to a diaphragm responsive to liquid at a variable pressure, such as a pressure related to the speed of the prime mover, or a mechanism driven thereby.

It is desired to be able to vary the flow across the said gap in the said controlling means in response to another variable condition, or any one of several conditions, associated with the system (in addition to the action of the baffle means) such as the rate of flow of fuel in the system, the fuel-air ratio, atmospheric pressure, the temperature in the combustion chamber, a manually operable regulating valve, or the like, and the object of the present invention is to enable this requirement to be met in a simple and satisfactory manner.

The invention comprises the combination with a means as above specified, of a plurality of valves responsive to different variable conditions in the system and adapted to control the rate of flow of liquid in the baffle-controlled duct.

The accompanying drawing illustrates one embodiment of the invention.

Referring to the drawing, the system thereshown includes a variable-delivery pump $a$ of the swash plate type, the angularly adjustable swash plate $b$ of which is adjustable for varying the pump output by a liquid operated servo mechanism. This mechanism comprises a piston $c$ contained in a cylinder $d$ and loaded by a spring $e$, the piston being connected to the swash plate by a rod $f$. Motive liquid for actuating the piston $c$ is supplied by the pump directly to one end of the cylinder $d$ through a passage $g$, and indirectly to the other end of the cylinder by a pipe $h$ and through various control devices to be hereinafter described, one of which includes a pair of coaxial ducts $i$ having a gap between their adjacent ends. The flow across this gap is controlled by a baffle means $j$ carried by a diaphragm $k$ which divides a hollow body part $m$ into two compartments, one of which contains the said ducts and the baffle means. The other compartment contains a spring $n$ acting on the diaphragm, and to this compartment liquid is conveyed by a pipe $o$ at a pressure corresponding to the speed of rotation of the pump. This liquid is derived from the pump inlet $p$ and is discharged to the interior of the pump casing along a passage $q$ in the rotary body of the pump, the pipe $o$ being in communication with the casing. It is to be understood that in respect of the liquid in the radial passage $q$, rotation of the pump body acts in the manner of a centrifugal pump means on said liquid and thereby a liquid pressure is generated in the pump casing corresponding to the speed of pump body rotation. Variation of speed of the pump, results in variation of the liquid pressure acting on the diaphragm $k$, and by consequent movement of the baffle means varies the pressure of the liquid acting on that side of the piston $c$ which is also subject to the pressure of the spring $e$.

In the discharge pipe $r$, by which the liquid fuel is conveyed from the pump to the burner, there is provided a manually operable control valve $s$, and also an automatically operable control means responsive to blower air pressure. This latter means comprises a hollow body part $u$ having therein an orifice $v$ with which co-operates a throttle $w$. The throttle is attached to a piston $x$ slidable in a cylinder $y$, and liquid can flow from the inlet end of the cylinder to the other end through a restricted orifice 2 in the piston (or cylinder). The said other end of the cylinder opens into a passage 3 the outlet of which is controlled by a normally-closed valve 4 on a lever 5 which latter is loaded by springs 6 one of which is attached to the throttle. The lever 5 is pivoted at 7 and is embraced by a flexible seal 8 which isolates the end of the lever carrying the valve from the other end which is connected to an evacuated elastic capsule 9 contained in a chamber 10 to which is admitted air derived from the blower. When the valve 4 is closed, the throttle is moved by the associated spring 6 to the position of minimum fuel delivery. With increased blower-air pressure, the valve is opened causing the liquid pressure acting on the piston $x$ to move the throttle in the direction for increasing the liquid flow past the throttle, thus regulating the ratio of fuel and air supplied to the burner in response to variations of blower-air pressure.

In one manner of carrying the invention into effect, there is combined with the system above described a plurality of normally-open valves responsive to different conditions for varying the flow in the baffle means controlled duct $i$. One such valve 12 is operable by variations of atmospheric air pressure. This valve is contained in a hollow body part 13 divided into two chambers by a partition 14, the valve being carried by a lever 15. Atmospheric air is admitted to the chamber containing an elastic capsule 16 which acts on the lever. The end of the lever which carries the valve is loaded by a spring 17, and the valve is arranged to control the flow of liquid derived from the pipe $h$.

In series with the said control means responsive to atmospheric air pressure, is arranged another control means generically indicated by 20 and responsive to the temperature in, for example, the combustion chamber of the engine, the said temperature causing variations of length of a rod 21 acting on the associated valve lever. As this control means is otherwise essentially similar to the air-responsive means above described, further description is unnecessary, the drawing being self explanatory.

Another control means similar to and in series with the other two is indicated generically by 22. The valve in this is responsive to the difference of the liquid pressure at the entrance and exit of the throttle $w$, these pressures being caused to act on a diaphragm 23 for actuating the associated spring-loaded valve.

Still another control means similar to 22 and generically indicated by 24 is arranged in series with the other and is responsive to the difference of liquid pressures at the opposite sides of the manually controlled means $s$, which pressures act on the diaphragm 25.

The mode of action is such that movement of any of the valves in the above described series arrangement varies the rate of flow of liquid from the pipe $h$ to the baffle means duct $i$, and so varies the liquid pressure acting on one side of the servo piston $c$, the servo piston being therefore responsive not only to the action of the baffle means $j$, but also to each of the other variable conditions above mentioned.

The invention is not, however, restricted to the example described. Any of the control means may be responsive to other conditions than those specified.

Having thus described my invention what I claim as new and desire to secure by Letters Patent is:

1. Means for controlling a liquid-operated servo mechanism for controlling the rate of supply of liquid fuel to an internal combustion prime mover comprising in combination, a duct for conveying motive liquid to the servo mechanism and including two parts having a gap between their adjacent ends, baffle means movable in relation to the gap to control the flow in said duct, a plurality of valve means arranged in series in said duct for controlling the rate of flow in said duct, and a plurality of means responsive to different variable conditions for respectively actuating said valve means.

2. Means according to claim 1, in which said valve means are each normally open.

References Cited in the file of this patent

UNITED STATES PATENTS

| Number | Name | Date |
|---|---|---|
| 2,372,393 | Ray | Mar. 27, 1945 |
| 2,397,448 | Todd | Mar. 26, 1946 |
| 2,424,304 | Cunningham | July 22, 1947 |
| 2,621,632 | Ifield | Dec. 16, 1952 |

FOREIGN PATENTS

| Number | Country | Date |
|---|---|---|
| 458,823 | Great Britain | Dec. 28, 1936 |